United States Patent
Stanek

(12) 
(10) Patent No.: US 6,296,202 B1
(45) Date of Patent: Oct. 2, 2001

(54) AIRCRAFT WEAPONS BAY ACOUSTIC SUPPRESSION APPARATUS

(75) Inventor: Michael J. Stanek, Springboro, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/501,289

(22) Filed: Feb. 9, 2000

(51) Int. Cl.⁷ ........................................ B64C 1/38
(52) U.S. Cl. ........................... 244/1 N; 244/130
(58) Field of Search ................. 244/1 R, 137.1, 244/130, 129.3, 201, 204, 1 N, 199

(56) References Cited

U.S. PATENT DOCUMENTS

| | | | |
|---|---|---|---|
| H324 | * | 9/1987 | Rubin ............................. 244/117 R |
| 4,323,209 | * | 4/1982 | Thompson ........................ 244/201 |
| 4,858,850 | * | 8/1989 | McNay ............................ 244/1 R |
| 5,069,397 | * | 12/1991 | Haslund .......................... 244/1 R |
| 5,340,054 | | 8/1994 | Smith et al. ..................... 244/1 N |
| 5,520,358 | * | 5/1996 | Kahn et al. ...................... 244/1 R |
| 5,699,981 | | 12/1997 | McGrath et al. .................. 244/1 N |
| 5,818,947 | * | 10/1998 | Cattafesta, III et al. ......... 244/130 |
| 6,050,527 | * | 4/2000 | Herbert et al. .................... 244/210 |
| 6,078,674 | * | 6/2000 | Cattafesta, III et al. .......... 244/130 |
| 6,098,925 | * | 8/2000 | Burdsall, II et al. ............. 244/137.1 |
| 6,186,445 | * | 2/2001 | Batcho ........................... 244/130 |
| 6,206,326 | * | 3/2001 | Stanek et al. .................... 244/130 |

OTHER PUBLICATIONS

Parekh, D. E. et al., Innovative Jet Flow Control: Mixing Enhancement Experiments, AIAA Paper No. 96–0308, American Institute of Aeronautics and Astronautics, AIAA, Aerospace Sciences Meeting, 34th, Reno, NV, Jan. 15–18, 1996.

McGrath et al., Active Control of Shallow Cavity Acoustic Resonance, AIAA Paper No. 96–1949, American Institute of Aeronautics and Astronautics, AIAA Fluid Dynamics Conference, 27th, New Orleans, LA, Jun. 17–20, 1996.

* cited by examiner

Primary Examiner—Charles T. Jordan
Assistant Examiner—Christian M. Best
(74) Attorney, Agent, or Firm—Richard A. Lambert; Bobby D. Scearce; Thomas L. Kundert

(57) ABSTRACT

An aircraft weapons bay acoustic suppression apparatus is disclosed. The apparatus reduces or eliminates acoustic resonance within an open cavity of an aircraft such as a weapons bay of an aircraft in flight. The apparatus includes an oscillatable spoiler plate which is extended into the airstream. At least one shaker is placed in operative engagement with the spoiler plate in order to oscillate the spoiler plate at high frequencies and high amplitudes to seed the shear layer with frequencies which directly complete with the natural frequency of the shear layer vortices. In this way, the damage arising from natural shear layer vortices can reduced or canceled within the weapons bay.

11 Claims, 7 Drawing Sheets

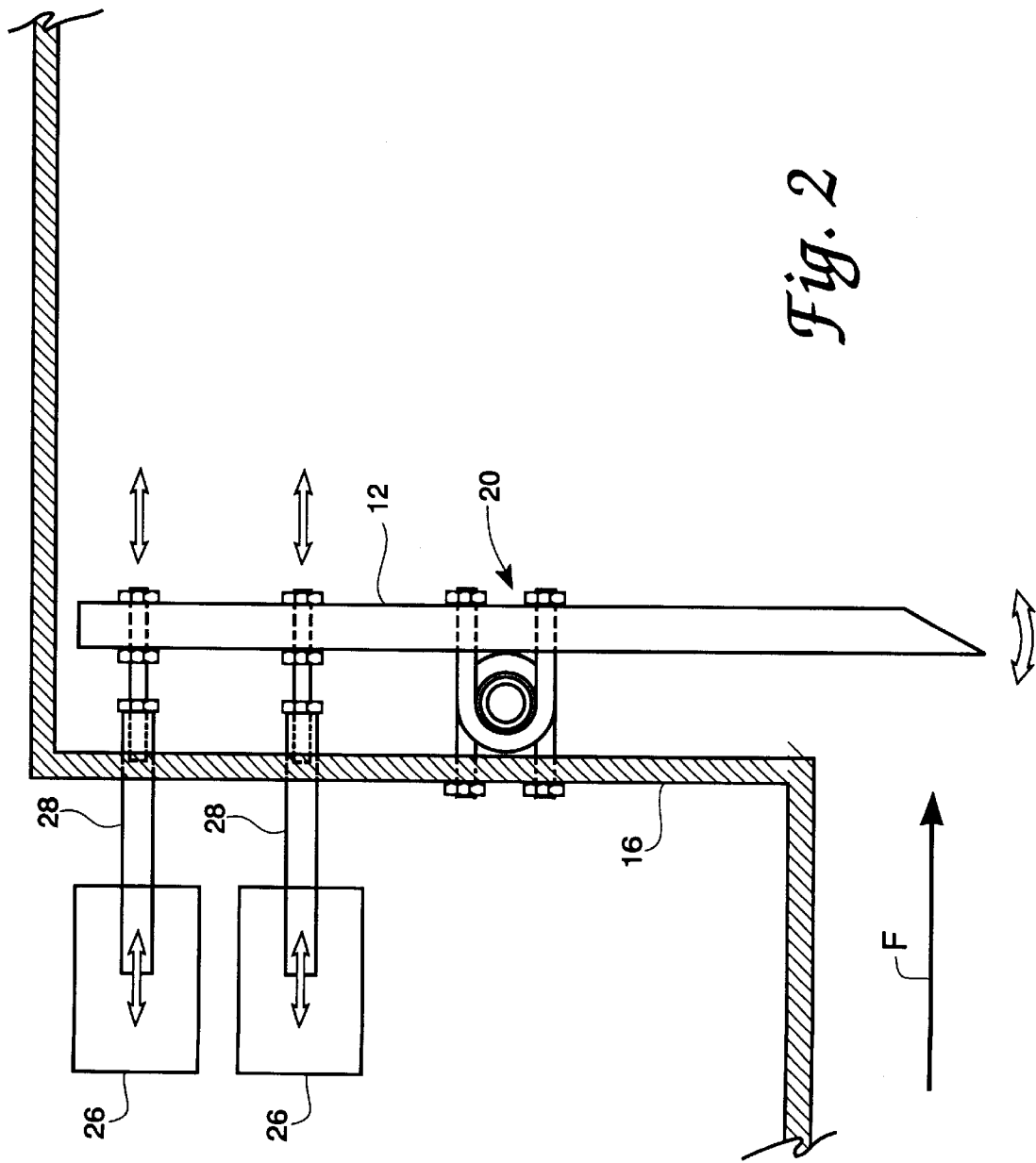

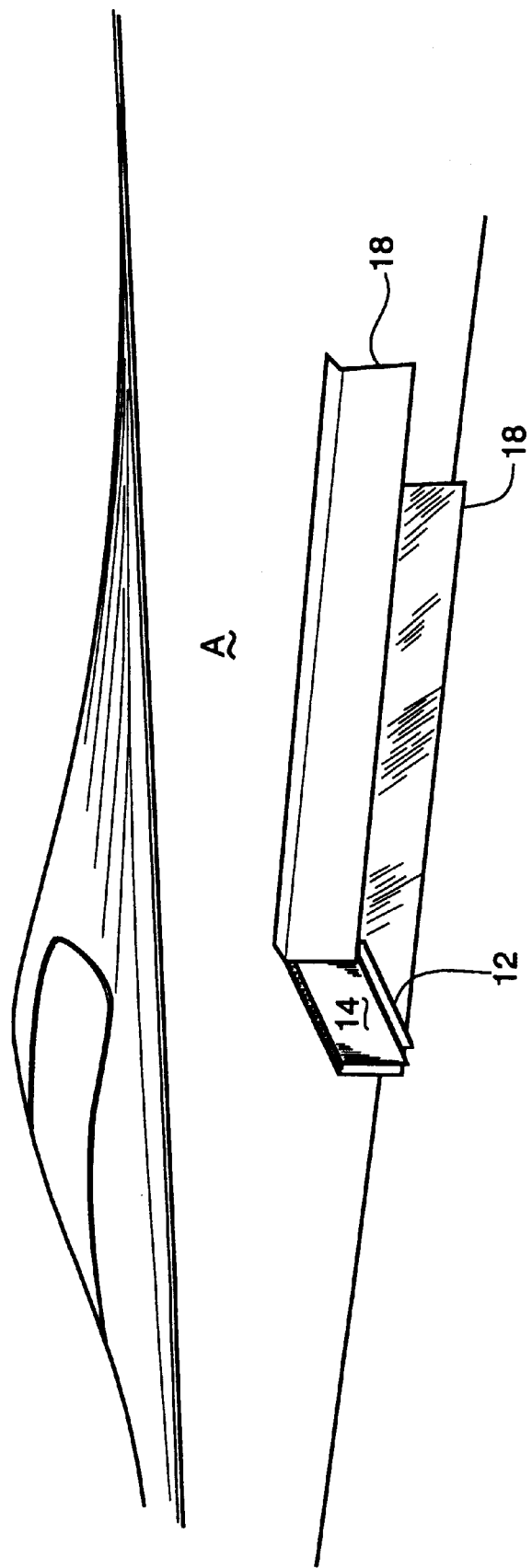

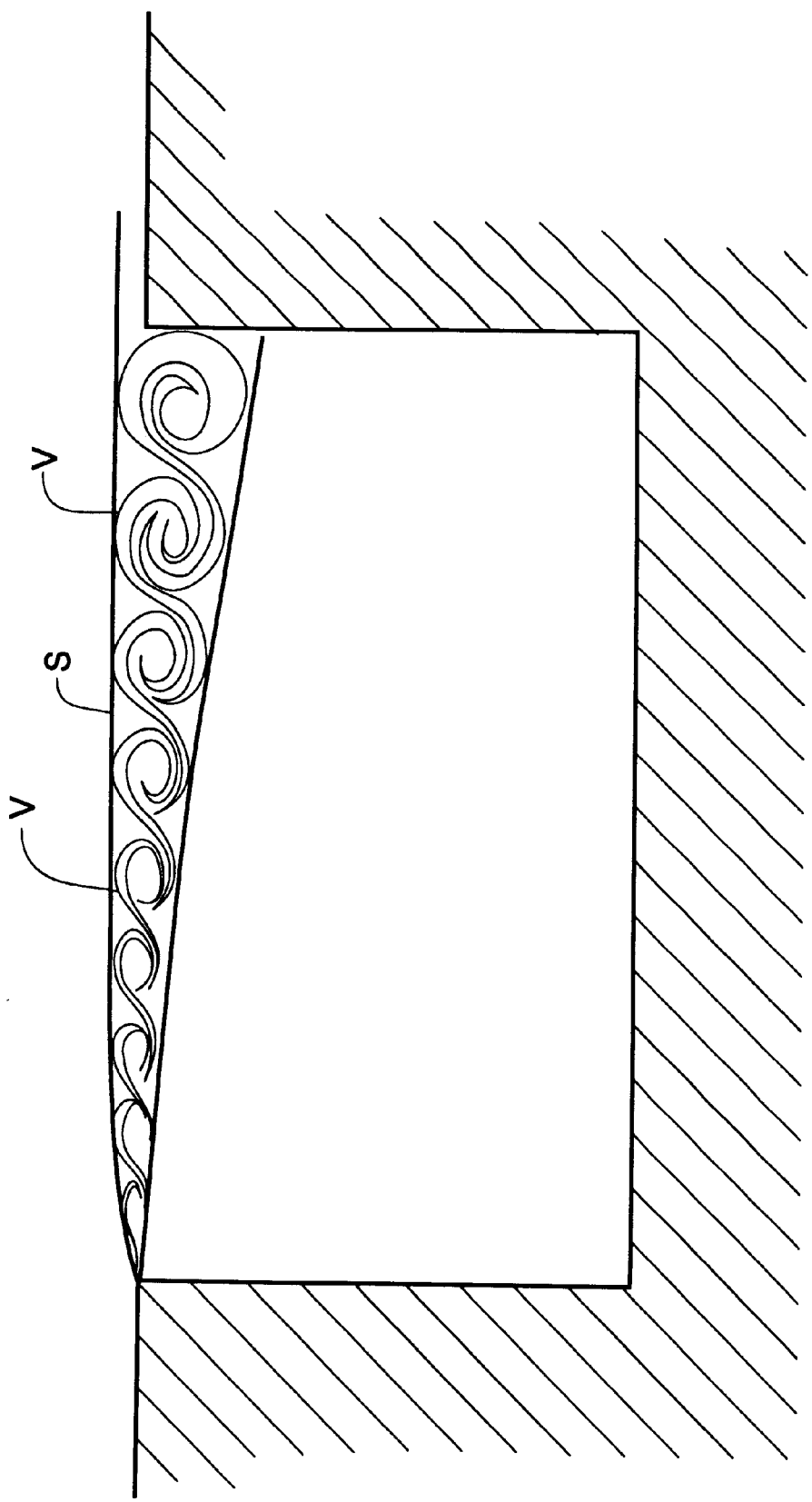

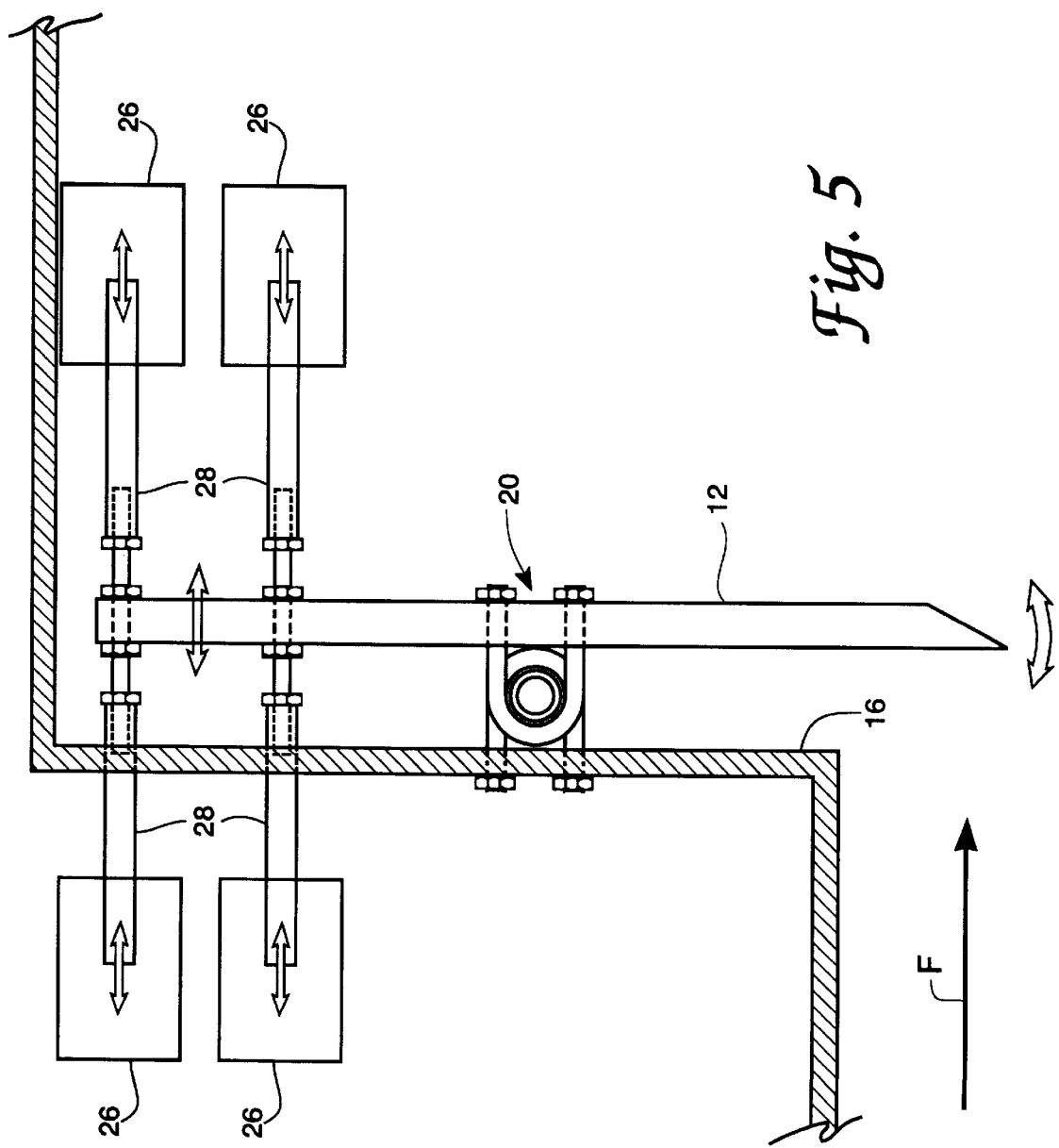

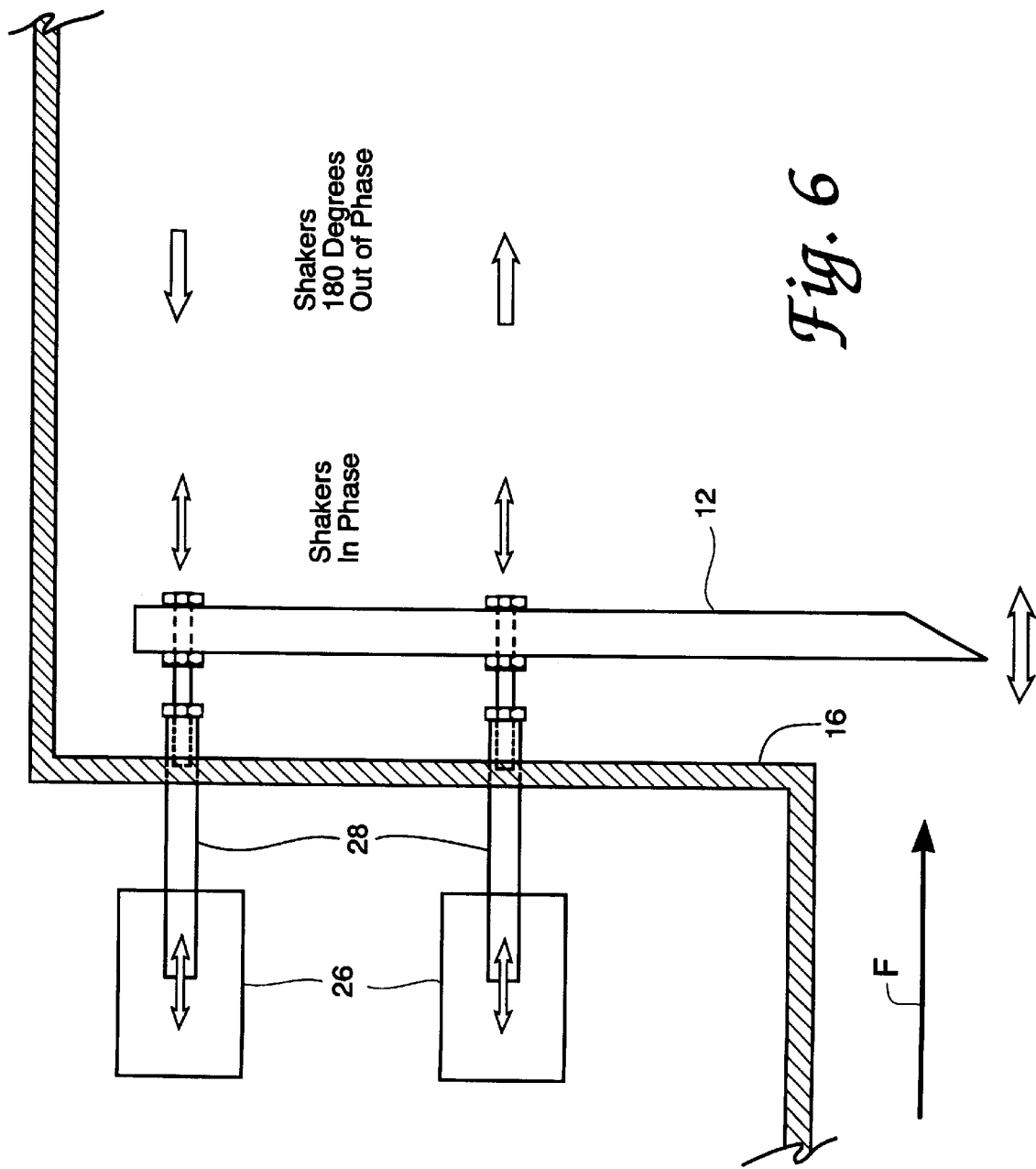

AIRCRAFT WEAPONS BAY ACOUSTIC SUPPRESSION APPARATUS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to reducing open cavity acoustic resonance, and more particularly to an apparatus for oscillating an aircraft spoiler to reduce acoustic resonance within an open weapons bay of an aircraft in flight.

As is well known in the art, depending on configuration and application, military aircraft will sometimes carry weapons to be discharged during flight within one or more cavities, commonly known as weapons bays. The weapons bays usually include a pair of doors, which are opened only when release of the weapon stores is anticipated. During the remainder of the aircraft flight, the weapons bay doors are closed, presenting a smooth surface to enhance aerodynamic performance as well as other characteristics, such as stealthiness, for example.

When the weapons bay doors are opened in flight, a thin region called a shear layer is created wherein the airflow abruptly transitions from a low speed flow inside the cavity to a high speed flow outside the cavity. This shear layer is characterized by instability which causes the shear layer to form tight, circular rotating pockets of flow commonly referred to as vortices. These vortices impinge on the rear wall of the cavity causing high levels of resonance and high acoustic levels inside the weapons bay. This acoustic resonance can be strong enough to damage the aircraft or its systems, and, therefore, is quite undesirable.

Attempts have been made in the past to reduce acoustic resonance occurring within an open aircraft weapons bay. For example, U.S. Pat. No. 5,699,981 to McGrath et al. describes a system incorporating a cylindrical member disposed on the surface of the aircraft near the leading edge of the cavity. The cylindrical member is projected into the airflow of aircraft in flight to create vortices to reduce acoustic resonance. Similarly, U.S. Pat. No. 5,340,054 to Smith et al. describes an apparatus for acoustic reduction using a series of perturbation pins placed on the surface of the aircraft for generating vortices to disrupt the shear layer, for the purpose of reducing acoustic resonances within an open cavity. While somewhat effective, these prior art systems are not without the need for improvement. For example, these patents describe systems requiring the attachment of structures onto the surface of the aircraft, increasing drag as well as significantly interrupting the desirable smooth aircraft surface. Moreover, their effectiveness decreases dramatically at aircraft speeds up to and exceeding Mach 1.

A system recently described by Parekh, D. E. et al., *Innovative Jet Flow Control: Mixing Enhancement Experiments,* AIAA Paper No. 96-0308, American Institute of Aeronautics and Astronautics, AIAA, Aerospace Sciences Meeting, 34th, Reno, Nev., Jan. 15–18, 1996, includes vibrating wedges driven by piezoelectric actuators. This system, while providing the proper high frequency range of operation, is unsuited for application to the weapons bay problem because it is incapable of providing sufficient amplitude.

A need exists therefore for an improved aircraft weapons bay acoustic suppression apparatus. Such an apparatus would provide improved acoustic resonance reduction, enhancing aircraft operation as well as contributing to aircraft longevity.

SUMMARY OF THE INVENTION

It is therefore a primary object of the present invention to provide an aircraft weapons bay acoustic suppression apparatus overcoming the limitations and disadvantages of the prior art.

It is another advantage of the present invention to provide an aircraft weapons bay acoustic suppression apparatus providing acoustic resonance reduction over a wide range of aircraft operating conditions.

It is yet another object of the present invention to provide an aircraft weapons bay acoustic suppression apparatus which can be readily incorporated into existing aircraft structures and systems.

It is still another object of the present invention to provide an aircraft weapons bay acoustic suppression apparatus which can be utilized on a wide variety of aircraft.

These and other objects of the invention will become apparent as the description of the representative embodiments proceeds.

In accordance with the foregoing principles and objects of the invention, an aircraft weapons bay acoustic suppression apparatus is provided to dramatically reduce acoustic resonance within an open weapons bay of an aircraft in flight. The apparatus can be incorporated into a wide variety of aircraft and can be utilized in a wide range of operating conditions.

As is known in the art, opening the weapons bay doors in flight gives rise to the creation of a thin region called a shear layer where the airflow abruptly transitions from a low speed flow inside the cavity to a high speed flow outside the cavity. This shear layer is characterized by instability which causes the shear layer to form tight, circular rotating pockets of fluid flow commonly referred to as vortices. These vortices impinge on the rear wall of the cavity and correspondingly generate an acoustic wave which propagates in the opposite way, upstream. The acoustic wave thus generated interacts with the shear layer to influence the size and spacing of the vortices. If the frequency and phase of the acoustic wave coincides with that of the shear layer instabilities, the vortices generated by this "forced" shear layer can become a whole number (1, 2, 3, etc.) with respect to the cavity, generating high levels of undesirable acoustic resonance. The effects of this can be often be strong enough to damage the aircraft or its systems, and, as can be appreciated, are quite undesirable.

According to an important aspect of the present invention, the aircraft weapons bay acoustic suppression apparatus includes a spoiler plate that is oscillated at a frequency designed to seed the shear layer with frequencies which directly compete with the natural frequency of the shear layer vortices. In this way, the damage arising from natural shear layer vortices can reduced or canceled within the weapons bay.

Advantageously, the oscillatable spoiler plate can be mounted on the existing deployable spoiler mounted within the weapons bay. In this way, the spoiler plate can be automatically deployed into the airstream, avoiding the necessity of providing additional deployment structures.

The spoiler plate is oscillated back and forth by a commercially available electromechanical shaker. This has the advantage of providing ready component availability as well as providing the desirable high frequency, high amplitude operation.

As can be seen, the aircraft weapons bay acoustic suppression apparatus of the present invention advantageously provides for a reduction in acoustic resonances within the open bay. The apparatus of the present invention requires few parts, takes up little space and can be readily incorporated into many different aircraft.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a side view of an alternative embodiment of the aircraft weapons bay acoustic suppression apparatus of the present invention;

FIG. 3 is a perspective view of the aircraft weapons bay acoustic suppression apparatus of the present shown mounted on an aircraft, and extended into the operational position;

FIG. 4 is a diagrammatic view illustrating the formation of shear layer vortices across an open aircraft cavity;

FIG. 5 is a is a cross sectional view of an alternative embodiment of the aircraft weapons bay acoustic suppression apparatus of the present invention;

FIG. 6 is a is a cross sectional view of another alternative embodiment of the aircraft weapons bay acoustic suppression apparatus of the present invention;

DETAILED DESCRIPTION OF THE INVENTION

Figure 1:
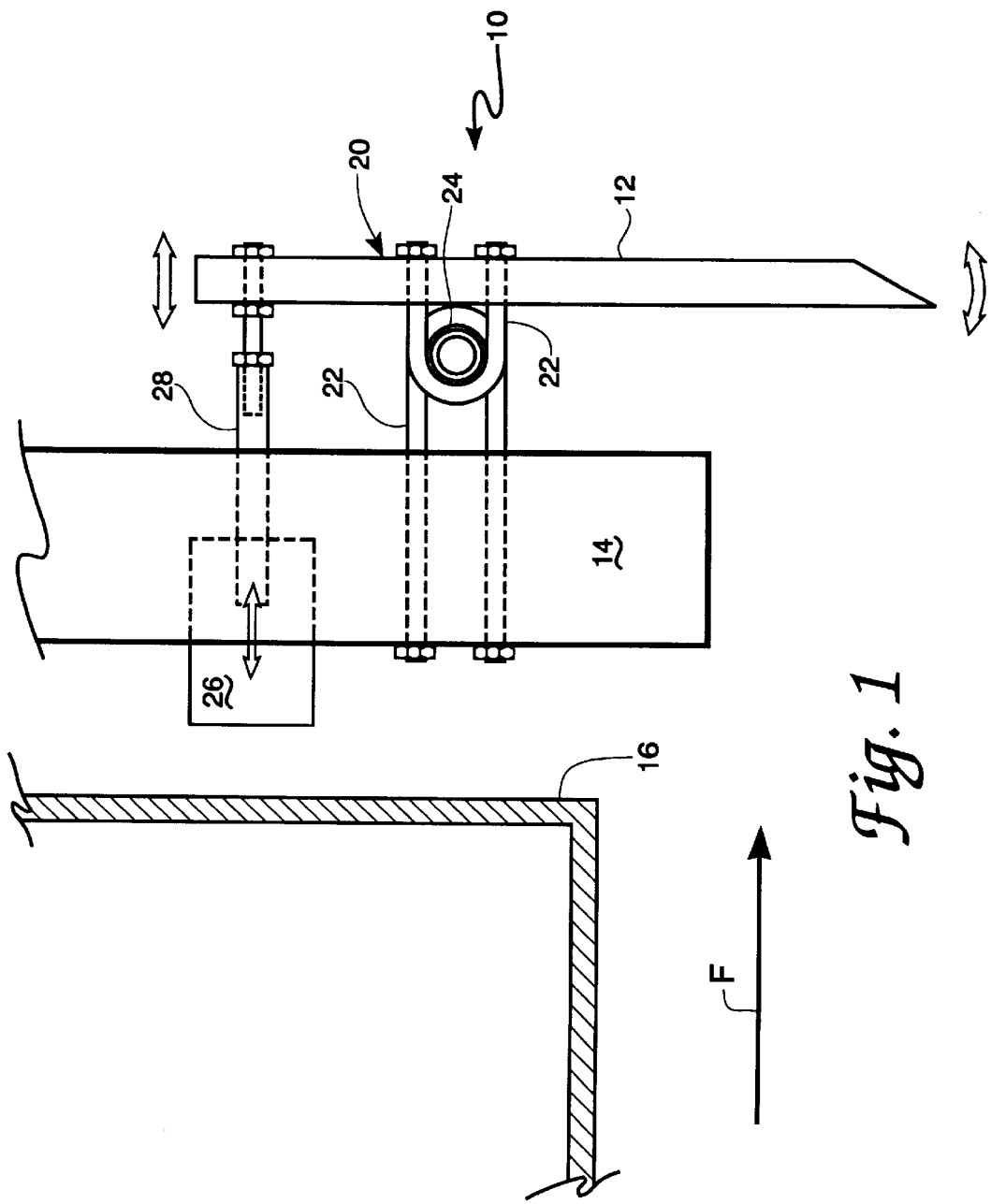
FIG. 1 is a cross sectional view of an aircraft weapons bay, showing the acoustic suppression apparatus of the present invention mounted on an existing, deployable spoiler.

Reference is made to the drawing figures showing the aircraft weapons bay acoustic suppression apparatus 10 of the present invention. The acoustic suppression apparatus 10, is provided to dramatically reduce acoustic resonance within an open weapons bay of an aircraft in flight.

Reference is directed to FIG. 4 wherein a representative shear layer S is shown having formed across an open cavity of an aircraft in flight. The shear layer S develops as the airflow abruptly transitions from a low speed flow inside the cavity to a high speed flow outside the cavity. This shear layer S is characterized by an instability which causes the shear layer S to form tight, circular rotating pockets of fluid flow commonly referred to as vortices V to form. These vortices V impinge on the rear wall of the cavity and correspondingly generate an acoustic wave (not shown) which propagates in the opposite way, upstream. The acoustic wave thus generated interacts with the shear layer to influence the size and spacing of the vortices. If the frequency and phase of the acoustic wave coincides with that of the shear layer instabilities, the vortices generated by this "forced" shear layer can become a whole number (1, 2, 3, etc.) with respect to the cavity, generating high levels of undesirable acoustic resonance. The effects of this can be often be strong enough to damage the aircraft or its systems, and, as can be appreciated, are quite undesirable.

As shown in FIG. 1, the acoustic suppression apparatus 10 includes an oscillatable spoiler plate 12. As shown, the spoiler plate 12 is oscillatable in the direction of airflow F across the cavity. The spoiler plate 12 can be pivotably mounted to the front wall of the cavity, or, it can be pivotably mounted on an existing deployable aircraft spoiler 14 so as to be extensible into the airstream of the aircraft A in flight. Deployable aircraft spoilers 14 are well known and are commonly used on a wide variety of aircraft to assist in weapons separation. As is known, the aircraft spoiler 14 is usually retained within the weapons bay 16 adjacent the leading edge thereof, shown in FIG. 2, and is usually deployed into the airstream after the weapons bay doors 18 are opened in preparation for weapons release, as shown in FIG. 3. As shown in FIG. 3, the aircraft spoiler 14 is usually aligned perpendicularly to the direction of airflow, and usually transverses the entire width of the weapons bay 16. Similarly, the oscillatable spoiler plate 12 of the present invention can extend transversely across the entire width of the weapons bay 16, maximizing interaction with the airstream.

As shown in FIG. 1, the oscillatable spoiler plate 12 is pivotably mounted to the deployable aircraft spoiler 14 via at least one pivot 20. The pivot 20 can include a pair of attachment U-bolts 22 engaging a pivot pin 24 as shown, or can be any number of commercially available hinges or other pivotable arrangements which would be apparent to one skilled in the art.

An electromechanical shaker 26 is operatively engaged with the spoiler plate 12 via an actuator rod 28. The actuator rod 28 connection enables the oscillations of the shaker 26 to be imparted to the spoiler plate 12. Generally, the anticipated range of operational frequencies of the spoiler plate 12 is from 1 kHz to 10 kHz. Advantageously, this is within the operational frequency range of several commercially available shaker units such as, for example, from Labworks, Inc., Costa Mesa Calif., or MB Dynamics, Cleveland, Ohio. These commercially available shakers provide a wide choice of frequency and amplitude operation and are therefore useful in a wide variety of aircraft applications. For example, the PM25A shaker from MB Dynamics provides as much as 0.5 inch amplitude at 10 kHz frequency with a 25 lb. actuation force. This provides for effective operation by enabling spoiler plate 12 oscillation at high frequencies and high amplitudes to seed the shear layer with frequencies which directly complete with the natural frequency of the shear layer vortices even at very high aircraft speeds, something heretofore not possible with the acoustic suppression methods of the prior art.

While the choice of shaker 26 operating characteristics depends on aircraft application, it has been determined that no performance degradation occurs by operation at a frequency higher than that necessitated by a unique, instantaneous flight condition. This enables single frequency operation of the aircraft weapons bay acoustic suppression apparatus 10 of the present invention while providing efficient acoustic suppression over the entire operational flight envelope. As can be appreciated, this simplifies design and maximizes effectiveness, making the aircraft weapons bay acoustic suppression apparatus 10 of the present invention suitable for incorporation into a wide variety of aircraft applications.

It should be appreciated that the number, placement and size of the shakers 26 and the physical parameters of the spoiler plate 12 such as the plate tip to pivot 20 distance can be varied to accommodate a wide variety of aircraft configurations without departing from the spirit and scope of the present invention. For example, reference is made to FIG. 5, wherein one of these alternative embodiments is shown. As shown four shakers 26 are placed in operative engagement with the spoiler plate 12. In this embodiment, the pivot 20 is attached directly to the wall of the weapons bay 16.

In yet another alternative embodiment, as shown in FIG. 6, the spoiler plate 12 is mounted directly to the shaker actuator rods 28, without a pivot 20. In this embodiment, the shakers can either work in phase or out of phase. Note that in these two embodiments, the aircraft weapons bay acoustic suppression apparatus 10 can be utilized independently of the deployable aircraft spoiler 14.

Figure 7B:
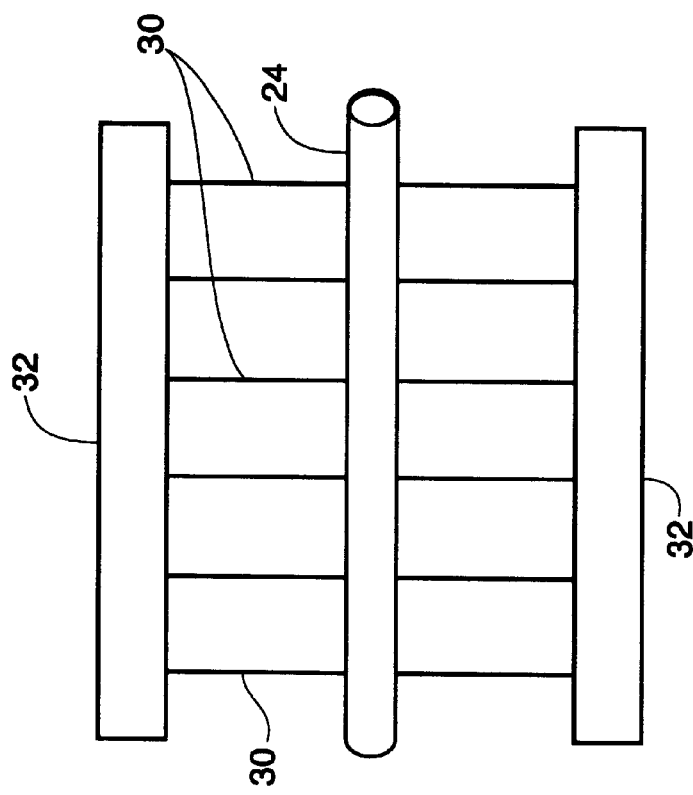
FIG. 7a is a side elevational view of an alternative embodiment of the spoiler plate of the aircraft weapons bay acoustic suppression apparatus of the present invention; and, FIG. 7b is a side elevational view of an alternative embodiment of the spoiler plate of the aircraft weapons bay acoustic suppression apparatus of the present invention showing the addition of tiebars.
Figure 7A:
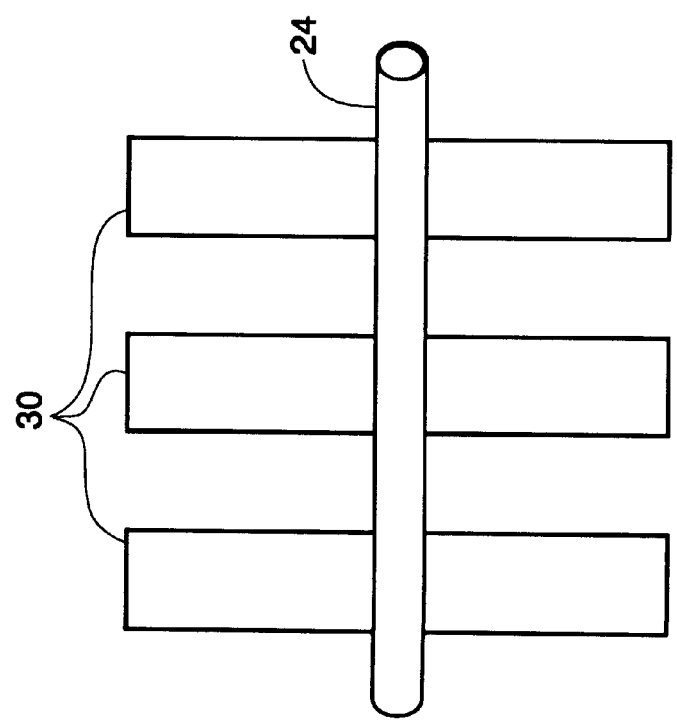

Depending on aircraft application and anticipated operating conditions, the spoiler plate 12 may consist of a plurality of spoiler bars 30 extending orthogonally from the pivot pin 24, as shown in FIG. 7a. This alternative embodiment would be useful in applications wherein the solid spoiler plate 12 of the preferred embodiment would be too heavy to oscillate effectively. In order to add a degree of rigidity, a pair of tiebars 32, as shown in FIG. 7b can be attached to the distal ends of the spoiler bars 30.

It should be appreciated that the acoustic suppression apparatus 10 of the present invention has potential application in areas other than cavity resonance reduction such as reduction of acoustic levels in the exhaust of vertical takeoff aircraft (such as the Harrier or future Joint Strike Fighter) or in more conventional jet exhausts (where shear layers exist at the edge of the jet, similar to the shear layer spanning the weapons bay). In the vertical takeoff problem, a potential for acoustic resonance exists between the ground and the underside of the aircraft. In the free jet exhaust (coming out of the rear of a jet aircraft), a resonant condition known as nozzle screech exists, where a complex interaction occurs among the shear layer, the nozzle lip, and shock cells present in the exhaust. Advantageously, the acoustic suppression apparatus 10 of the present invention can significantly reduce both turbulent mixing noise, as well as resonant conditions in both the jet exhaust and vertical takeoff problems.

In summary, numerous benefits have been described from utilizing the principles of the present invention. The aircraft weapons bay acoustic suppression apparatus 10 of the present invention provides for a reduction in acoustic resonances within the open bay. The apparatus of the present invention requires few parts, takes up little space and can be incorporated into many different aircraft.

The foregoing description of the preferred embodiment has been presented for purposes of illustration and description. It is not intended to be exhaustive or to limit the invention to the precise form disclosed. Obvious modifications or variations are possible in light of the above teachings. For example, other alternative embodiments using multiple shakers 26 operating in parallel or complimentary fashion with or without pivots 20 are possible. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. An apparatus for suppressing acoustic resonance within an open cavity of an aircraft, comprising:

an oscillatable spoiler plate received within said cavity and adjacent the leading edge thereof; said spoiler plate being aligned transversely to the direction of airflow across the cavity and oscillatable back and forth in the direction of airflow across the cavity; and, a shaker in operative engagement with said spoiler plate for oscillating said spoiler plate.

2. The apparatus of claim 1 wherein said spoiler plate is extensible into the airflow of the aircraft in flight.

3. The apparatus of claim 2 wherein said spoiler plate is pivotably mounted to an existing extensible aircraft spoiler.

4. The apparatus of claim 1 wherein said spoiler plate is pivotably mounted to the leading edge of the cavity.

5. The apparatus of claim 1 wherein said spoiler plate is a longitudinal pivot pin having a plurality of spoiler bars attached orthogonally thereto.

6. The apparatus of claim 5 wherein said spoiler plate further includes a tiebar attached to the distal end of each of said spoiler bars, parallel to said pivot pin.

7. An apparatus for suppressing acoustic resonance within an open cavity of an aircraft, comprising:

an extensible aircraft spoiler received within said cavity, said aircraft spoiler being adjacent the leading edge of said cavity and extensible into the airflow of the aircraft in flight, an oscillatable spoiler plate pivotably mounted on said aircraft spoiler, said spoiler plate being aligned transversely to the direction of airflow across the cavity and oscillatable in the direction of airflow across the cavity; and, a shaker in operative engagement with said spoiler plate for oscillating said spoiler plate.

8. The apparatus of claim 7 wherein said spoiler plate is a longitudinal pivot pin having a plurality of spoiler bars attached orthogonally thereto.

9. The apparatus of claim 8 wherein said spoiler plate further includes a tiebar attached to the distal end of each of said spoiler bars, parallel to said pivot pin.

10. An apparatus for suppressing acoustic resonance within an open cavity of an aircraft, comprising:

an oscillatable spoiler plate received within said cavity and adjacent the leading edge thereof, said spoiler plate being a longitudinal pivot pin having a plurality of spoiler bars attached orthogonally thereto, said spoiler plate being aligned transversely to the direction of airflow across the cavity and oscillatable in the direction of airflow across the cavity; and, a shaker in operative engagement with said spoiler plate for oscillating said spoiler plate.

11. The apparatus of claim 10 wherein said spoiler plate further includes a tiebar attached to the distal end of each of said spoiler bars, parallel to said pivot pin.

* * * * *